Figure 1:
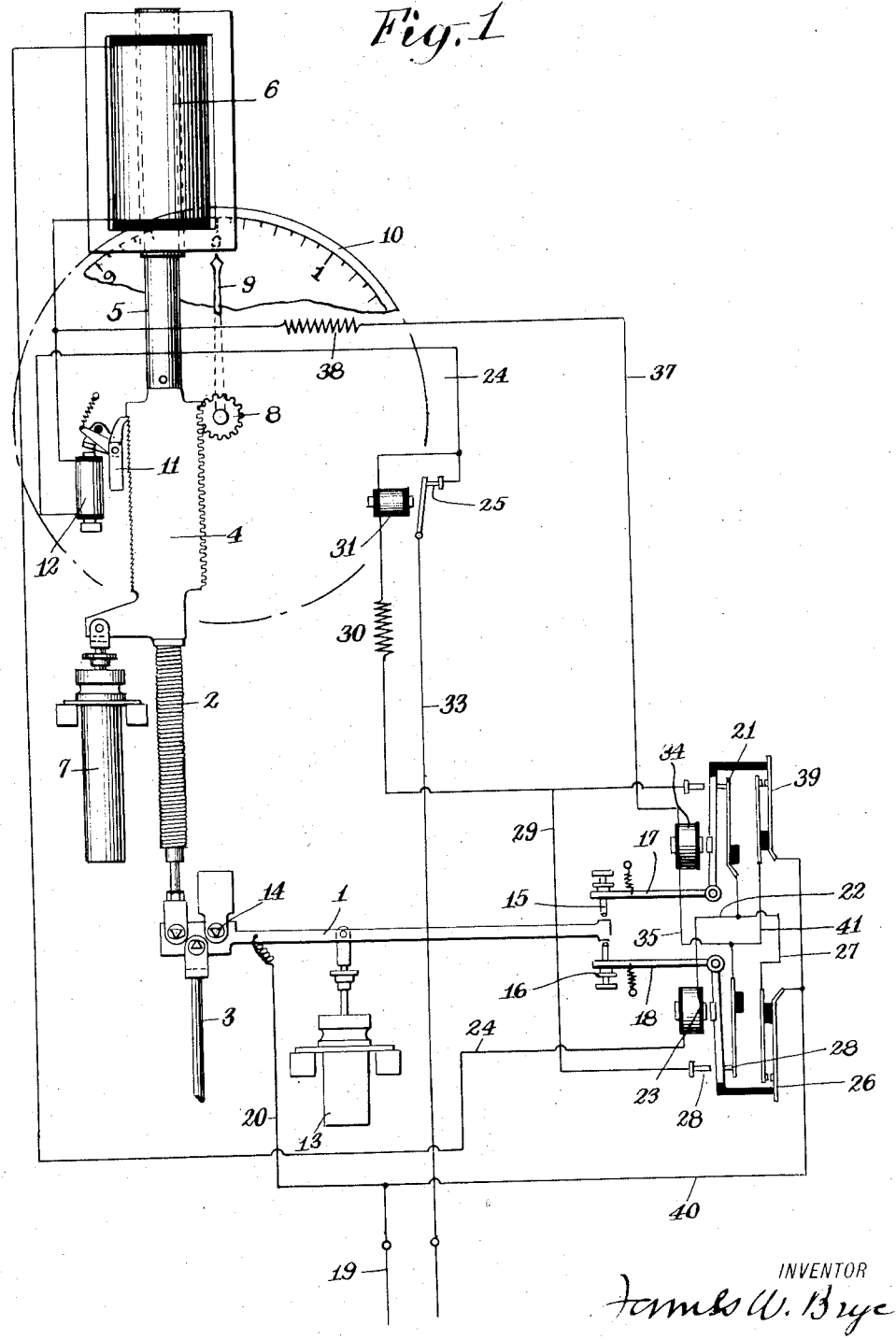

Oct. 9, 1923.
1,469,987

J. W. BRYCE

WEIGHING SCALE

Original Filed Oct. 29, 1918  2 Sheets-Sheet 1

INVENTOR
James W. Bryce
BY
Ken. Page, Cooper & Hayward
ATTORNEYS.

Oct. 9, 1923.

J. W. BRYCE

WEIGHING SCALE

Original Filed Oct. 29, 1918    2 Sheets-Sheet 2

1,469,987

Patented Oct. 9, 1923.

1,469,987

UNITED STATES PATENT OFFICE.

JAMES W. BRYCE, OF BINGHAMTON, NEW YORK, ASSIGNOR, BY MESNE ASSIGNMENTS, TO DAYTON SCALE COMPANY, OF DAYTON, OHIO, A CORPORATION OF NEW JERSEY.

WEIGHING SCALE.

Application filed October 29, 1918, Serial No. 260,110. Renewed February 9, 1921. Serial No. 443,725.

*To all whom it may concern:*

Be it known that I, JAMES W. BRYCE, a citizen of the United States, residing at Binghamton, in the county of Broome and State of New York, have invented certain new and useful Improvements in Weighing Scales, of which the following is a full, clear, and exact description.

I shall describe in this application for Letters Patent an invention which is an improvement in weighing scales, more particularly in means for use therewith for actuating a weight indicator, or like device, which is required to be set proportionately to weight, by a source of power independent of that due to gravity in its action on the scale. The object in such an appliance is that the frictional load of these parts does not in any way influence or affect the correctness of the weighing.

In carrying out this invention I provide means for automatically applying a counter pull to the scale which is equal and opposite to the force of gravity or gravity pull tending to move the movable parts of the scale. This counter pull, or more exactly the displacement of parts corresponding and proportional to the counter pull, is then measured by any suitable mechanism. In the drawings attached to this application which illustrate a form of device involving the invention, I have shown a visual mechanism for indicating the load, but it will be understood that the invention is applicable for use in combination with recording and computing mechanisms which usually impose so high a friction load upon a scale that their extensive and successful use is reduced to a minimum.

The special subject-matter of this application is an improvement on the weighing scale of my prior application Serial No. 145,132, filed January 29, 1917. The primary object here in view is to accurately centralize the scale or contact beam which shows the true balance. Other objects of the improvement are to reduce to a minimum sparking at the contacts, particularly those on the scale beam which are the most delicate ones upon the proper alignment of which the accuracy of the scale depends, and to simplify the apparatus and render its operation more certain and correct.

In the drawings hereto annexed Fig. 1 is a diagrammatic view of a scale embodying my invention and showing the circuits which control the movements of the scale balancing and indicating means. Figs. 2 to 7 are diagrams showing the positions of the movable contact fingers during different positions of the scale members.

Only such parts of the scale as are necessary to an understanding of the present invention are graphically illustrated, as will be understood.

The numeral 1 indicates the contact beam of a scale. Attached to this beam on one side of the fulcrum is a yielding connection here shown as a scale or weighing spring 2, the other end being supported in the manner hereinafter set forth. The draft rod to the scale pan or platform where the weight to be measured is applied is designated by 3.

The upper end of the spring 2 is connected to the lower end of a rack bar 4, and this latter is attached to a suitable power device, in this case the plunger armature 5 of a solenoid 6 the disposition of these parts being such that when solenoid 6 is energized it exerts an upward pull on spring 2, tending to distend it. To control the speed of movement of the rack 4, and the rate of distension of the spring 2, a dash pot 7 the plunger of which is connected with an arm on said rack is provided and is, preferably, filled with a liquid in which the plunger works, whereby a known resistance may be offered to the force applied by the solenoid 6.

In gear with the rack 4 is a pinion 8 on a spindle stationary with respect to the rack and carrying a pointer 9, which sweeps over a graduated scale 10 to indicate the distension of the weighing spring 2. The opposite edge of the rack 4 is formed or provided with teeth with which engages a pawl 11. The function of this pawl is to prevent the distended spring from pulling the rack bar down when the solenoid 6 is de-energized unless the pawl be disengaged from the teeth by the armature of an electro-magnet 12, in which event the rack bar is entirely free to ascend or descend.

It is also desirable that a device in the nature of a dash pot 13 be connected to the scale beam to prevent its too sudden or rapid oscillation, and as in all devices of this kind a fulcrum is provided for the beam at 14.

A dash pot or equivalent device is particularly desirable in this device to distort and slow down the period of oscillation of the controlling beam so that the controlling contacts will function properly.

The circuit connections and electrical elements will be described in connection with the following statement of operation. Assume that there is no weight on the scale platform; that the pointer 9 stands at zero and the scale beam stands midway between two contact points 15 and 16, carried by pivoted levers 17 and 18, respectively. Now, if weight be placed in the pan or upon the platform a downward pull is exerted on the draft rod 3 which causes the long end of the scale beam 1, turning about the fulcrum 14, to rise into engagement with contact 15 on lever 17 and this establishes an electric circuit which may be traced as follows. From battery or line 19, through wire 20, to and through the scale beam 1, contact 15, lever 17, a contact 21 which faces a right-angled extension of lever 17, wire 22, an electro-magnet 23, wire 24, solenoid 6, electro-magnet 12, wire 24, relay points 25, and thence back to battery or line.

The current in this circuit energizing magnet 23 causes the latter to attract the right-angled extension of lever 18 and to move the contact 16 which it carries upward for a short distance, and to also permit contacts 26 to come together and thereby establish a circuit from wire 40, which is connected with line wire 19, through said contacts 26, wire 27, and thence through wire 22, the magnet 23 and back to line over the path just described. The magnet 23 therefore by its attractive effect "locks" this circuit.

The contact 16 is so adjusted that when raised by the magnet 23 its end or point will lie just in the plane normally occupied by the lower side of the scale beam, or, in other words, it will be raised just far enough to make contact with that beam when the latter is in its normal or mid position.

By the conditions thus established the solenoid 6, being energized, pulls up its core and raises the rack 4, distending the spring 2, and at the same time magnet 12 being energized withdraws the pawl 11 to facilitate the movement of the rack 4. The spring 2 or equivalent yielding means will thus be stretched exerting an upward pull on the beam 1, and when this pull equalizes the downward pull thereon by the applied weight on the platform, the free end of the beam will begin to move downward, causing the latter to leave the contact 15. The spring pull does not necessarily exactly equal the gravity pull as the leverage of the point of application of the forces upon the beam permits the relative forces to be varied. The term "equalizes" will be understood to define such conditions. This downward movement, however, does not break the circuit of the solenoid because current will continue to flow through that part of the circuit which includes it through the engaging contacts 26. The movement of beam 1 will continue until it reaches its normal or mid position, touches contacts 16 and indicates perfect balance between the two forces acting upon it.

Figure 2:
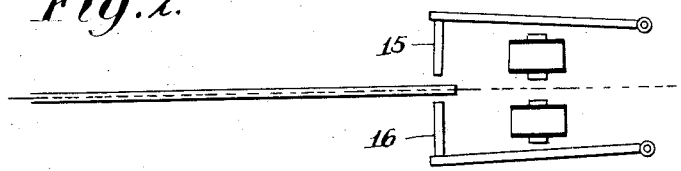
Figure 3:
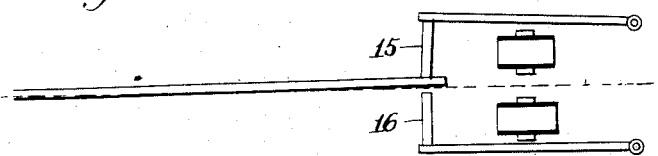
Figure 4:
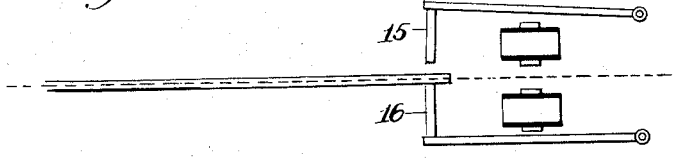

By reference to the diagrams, Figs. 2, etc., it will be seen that the normal position of the beam is shown in Fig. 2, or midway between the contacts 15 and 16. When weight is applied the position of the beam and contacts is shown in Fig. 3. When the beam under the action of spring 2 has reached the position of balance the relation of the parts is shown in Fig. 4, the beam being now in contact with the raised part 16.

The instant that this contact is made and the contact 16 depressed, a current will flow from line wire 19 through beam 1, contact 16, lever 18, contact 28, wire 29, resistance 30, relay magnet 31, and contacts 25 back to line, through relay 31, contacts 25 and wire 33. But relay 31, being thus energized, will draw or jerk its armature, forcing one of said contacts 25 to the left, thus separating said contacts, and as these latter are in the common return path for both magnets 12 and 23, and solenoid 6, all of these magnets will be de-energized.

Figure 5:
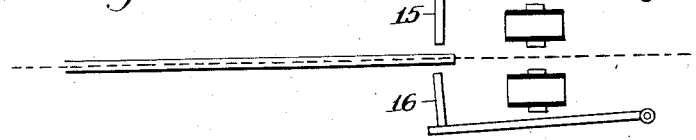

The lever 18 will thereupon fall to its normal position withdrawing the contact 16 from the scale beam 1, and the contacts will resume their normal position, as shown in Fig. 5. As all magnets are now de-energized and no current flowing, the scale is in balance, and the extent of the distension of the spring 2, as indicated by the pointer 9, locked in position by the pawl 11, is a measure of the weight applied. In the operation above described it will be noted that the circuit is broken at the points 25 of relay 31, and hence no spark will occur between the scale beam and the point 16. The contacts at this point therefore are not oxidized or pitted, and their length is thus kept constant, which conduces very materially to the continued accuracy of the scale.

If a weight be removed from the scale pan or reduced in amount, magnets 34 and 12 are energized but the solenoid 6 is not, because the wire 35 from the back contact 28 of the lever 18 with the contact 16 of which the beam comes into contact, is continued beyond magnet 34, in wire 37, which does not carry the current through said solenoid. A resistance 38 is included in wire 37, which is equal to that of the solenoid, however, so that the same current will flow.

Figure 6:
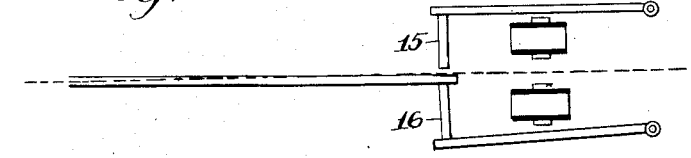
Figure 7:
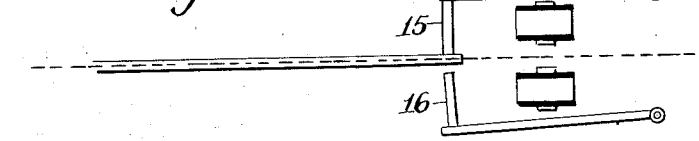

The action under these circumstances of the magnet 34 will be to bring together two contacts 39, so that current will then flow from line 19 to wire 40, through the contacts, wire 41, wire 35, the magnet 34, and thence to line over the path just traced through magnet 12. This causes the magnet 12 to withdraw the pawl 11 from the rack bar 4, and permits the rack to descend under the combined influence of the spring 2 and gravity until beam 1 moves out of contact with the point or stop 16, and into contact with the point 15, which, as above described, energizes the relay magnet 31 and restores the beam 1 to the balance position and lever 17 drops back leaving all points stationary. Figs. 6 and 7 illustrate the relation of the beam and contacts in the positions corresponding to Figs. 3 and 4, but under complementary conditions.

Hereafter in the claims I will use the term yielding means or yielding connection in referring to the spring 2. This term is to be taken broadly as covering a spring or equivalent counterbalancing device adapted to distend under an applied load and to exert a varying pull during such distention to the parts to which it is connected.

By the employment of the means herein described it is possible to secure extremely accurate indications of weight and at the same time the friction of the indicating parts does not in any way affect the operation of weighing, since the motive power due to gravity of the mass weighed is not utilized to differentially move the parts. Furthermore, the present construction increases the utility of a scale in that many sorts of mechanism can be associated with the scale to be displaced in accordance with the load thereon, and these auxiliary mechanisms need not be delicate devices requiring a minimum of power to move them.

Having now described my invention, what I claim is:—

1. In a weight indicating mechanism, the combination with the scale beam, of contacts on opposite sides of said beam, circuits controlled by the engagement therewith of the beam, an electric power device adapted to be energized by said circuits, a spring connected with the beam and adapted to be distended by the energized power device, and relays in the said circuits and contacts controlled thereby for interrupting the current of the said device as soon as the pull of the spring equalizes the gravity pull on the beam.

2. In a weight indicating mechanism, the combination with the scale beam of a solenoid and core, and a spring connecting the core to the beam, a contact on one side of the beam, a circuit controlled by the engagement therewith of the beam for energizing the solenoid, a relay in said circuit which when energized locks the same in a closed condition, and a contact on the opposite side of the beam adapted when energized and moved by the beam in its movement resulting from the increasing pull of the spring to break the solenoid circuit.

3. In a weight indicating machine, the combination with the scale beam, of an electric power device having a movable core, a rack connected to the core, a spring connecting the rack to the beam, a pointer opated by the rack, an electro-magnetically controlled pawl for engaging with and arresting the descent of the rack, a contact on one side of the beam, a circuit controlled by the engagement therewith of the beam when moved by the weight of an article to be weighed, to energize the power device and the pawl magnet, and a point or stop on the opposite side of the beam adapted by movement imparted to it by the beam to break the circuit through the power device and pawl magnet.

4. In a weight indicating machine, the combination with the scale beam, of a power device, a rack for indicating weight on a scale connected to the said device, a spring connecting the rack to the beam, an electro-magnetically controlled pawl for engaging with the rack for arresting its descent, a circuit adapted to be closed by the movement of the beam under an applied weight, means therein for closing and locking in closed condition the circuit of the power device and magnet of the pawl, a lever adapted to be moved by engagement therewith of the beam under the influence of the pull of the distended spring and adapted by such movement to break the circuit of the power device and pawl magnet.

5. In a weight indicating machine, the combination with the scale beam, a solenoid and core, a rack connected with the core, a spring connecting the rack with the beam, an electro-magnetically controlled pawl for engaging with the rack and preventing its descent, and means for closing the circuit of the solenoid and pawl magnet when a weight is applied to the beam and interrupting such circuit when the pull of the spring equalizes the pull of the weight, of a circuit adapted to be closed when, with the rack locked by its pawl in an elevated position, a weight is removed from the scale, said circuit including the pawl magnet, and means for interrupting such circuit when the pull of the spring equalizes the pull of the reduced weight, said last mentioned means being ineffective until the beam has been restored to approximately normal position.

6. The combination with the scale beam a solenoid and core, a rack connected to the core, a spring connecting the rack to the beam, a pointer operated by the rack to give weight indications, a pawl engaging with the rack and a magnet controlling the same, of stops or contacts on opposite sides of the beam, circuits controlled by the engagement of the beam with said contacts, relays and circuit controlling devices in said circuits operatively connected to close the circuit of the solenoid and pawl magnet when a weight is applied to the scale and to break such circuit when the pull on the spring equalizes the pull on the beam of the applied weight.

7. In a scale, in combination, a controlling beam, a load support connected thereto, means acting through said beam for opposing the gravity pull of the load, an electric power device for controlling the operation of said means, a pair of contact devices associated with said beam, means controlled thereby and operable upon the contacting engagement of the beam and one device for controlling the operation of said power device to initiate a weighing cycle, and means operable upon the contacting engagement of the beam and the other device for controlling the operation of said power device to terminate said cycle.

8. In a device of the class described, in combination with a scale beam, of an electric power device, a yielding connection connecting the power device and the beam, a contact upon one side of the beam, a circuit controlled by the engagement therewith of the beam for energizing the power device, a relay in said circuit which when energized locks the same in closed condition and a contact on the opposite side of the beam adapted, when energized and moved by the beam in its movement resulting from the increasing pull of the yielding connection, to break the circuit to the power device.

9. In a mechanism of the class described, the combination with a scale beam, of contacts upon opposite sides of the beam, circuits controlled by the engagement therewith of the beam, an electric power device adapted to be energized by said circuit, yielding means connected with the beam and adapted to be distended by the energized power device and relays, and contacts devices in said circuits for controlling the supply of current to said power device, said contact devices including a lever adapted to be raised into proximity to the beam upon the application of a load thereto, and to be thereafter displaced by the beam to break a circuit to the power device upon the return movement of the beam.

10. In a weighing scale in which parts are variably displaced by and proportionally to the amount of counterpull and in which a counterpull exerting means, a yielding means, and a controlling beam are provided, said counterpull exerting means comprising in part an electric power device, acting through the yielding means upon said beam and displacing the parts proportionally to the applied load, in combination, with means for controlling the action of the counterpull exerting means, comprising a plurality of contact devices associated with the beam, electric circuits, means for closing certain circuits upon the engagement of the beam and one contact device, means for thereafter maintaining said circuits closed, and means for breaking the circuits upon the contact of the beam with the other contact device.

11. In a weighing scale in which parts are variably displaced by and proportionally to the amount of counterpull and in which a counterpull exerting means, a yielding means, and a controlling beam are provided, said counterpull exerting means comprising in part an electric power device acting through the yielding means upon said beam and displacing the parts proportionally to the applied load, in combination with means for controlling the action of the counterpull exerting means, comprising a plurality of contact devices associated with the beam, electric circuit, means for closing certain circuits upon the engagement of the beam and one contact device, and for thereafter maintaining said circuits closed, means for concurrently maintaining other circuits open, and means for breaking the previously closed circuits upon the contact of the beam with the other contact device.

12. In a weighing scale in which parts are variably displaced by and proportionally to the amount of counterpull and in which a counterpull exerting means, a yielding means, and a controlling beam are provided, said counterpull exerting means comprising in part an electric power device, acting through the yielding means upon said beam and displacing the parts proportionally to the applied load, in combination with means for controlling the action of the counterpull exerting means, comprising a pair of contact devices associated with the beam, electric circuits, means for closing a circuit from the line to the electric power device upon the engagement of the beam and one contact device, means for thereafter maintaining said circuit closed, and means for breaking the said circuit after the retraction of the beam into contact with the other contact device.

13. In a weighing scale in which parts are variably displaced by and proportionally to the amount of counterpull and in which a counterpull exerting means, a yielding means, and a controlling beam are provided, said counterpull exerting means comprising in part an electric power device, acting through the yielding means upon said beam and displacing the parts proportionally to the applied load, in combination with means for retaining the parts in displaced position, means for controlling the action of the counterpull exerting means, comprising a plurality of contact devices associated with the beam, a power circuit to the electric power device and a supplementary circuit to the aforesaid retaining means, means for closing the power circuit upon the engagement of the beam and one contact device and for thereafter maintaining said circuit closed, means for maintaining the supplementary circuit open when the power circuit is closed, and means for breaking the power circuit upon the contact of the beam with the other contact device and for concurrently establishing the supplementary circuit.

14. In a weighing scale in which parts are displaced by power independent of gravity of the load, comprising a controlling beam, a yielding means connected thereto and having means for displacing said parts in one direction, a counterpull exerting means connected to the beam through the yielding means and adapted to overpower the yielding means and to displace the parts in the opposite direction, a pair of contact members associated with the beam, means controlled by the coaction of the beam and one or the other of said contact members for selectively bringing into predominating action the counterpull exerting means or the yielding means, whereby the parts are correspondingly displaced and the beam retracted and brought into contacting engagement with the other contact member, and means operable upon the last mentioned contacting engagement for restraining further predominating action of the said previously predominating means.

15. The invention set forth in claim 14 in which a dash pot is provided for retarding the movement of the controlling beam sufficiently to permit proper action of the contact members.

In testimony whereof I hereunto affix my signature.

JAMES W. BRYCE.